United States Patent [19]
Kim

[11] Patent Number: 5,954,837
[45] Date of Patent: Sep. 21, 1999

[54] METHOD FOR OPTIMIZING VITERBI DETECTOR THRESHOLD VALUES

[75] Inventor: Jae-June Kim, Bucheon, Rep. of Korea

[73] Assignee: Samsung Electronics Co., Ltd., Kyungki-do, Rep. of Korea

[21] Appl. No.: 08/903,837

[22] Filed: Jul. 31, 1997

[30]  Foreign Application Priority Data

Jul. 31, 1996 [KR] Rep. of Korea ...................... 96-32024

[51] Int. Cl.⁶ ............................... H04L 1/00; G11B 7/00; G11B 5/09; G11B 3/90
[52] U.S. Cl. ........................... 714/795; 369/59; 375/341; 360/53; 360/48
[58] Field of Search .............................. 714/795; 369/53, 369/59; 375/341; 371/43.6, 43.07

[56]  References Cited

U.S. PATENT DOCUMENTS

| 3,214,700 | 10/1965 | Hook . | |
|---|---|---|---|
| 4,823,360 | 4/1989 | Trembley et al. | 375/214 |
| 5,081,547 | 1/1992 | Howell | 360/31 |
| 5,317,456 | 5/1994 | Sugiyama | 386/93 |
| 5,341,387 | 8/1994 | Nguyen | 371/45 |
| 5,345,342 | 9/1994 | Abbott et al. | 360/48 |
| 5,440,433 | 8/1995 | Yun | 360/46 |
| 5,493,454 | 2/1996 | Ziperovich et al. | 360/45 |
| 5,610,776 | 3/1997 | Oh | 360/53 |
| 5,661,709 | 8/1997 | Takagi et al. | 369/59 |

*Primary Examiner*—Emmanuel L. Moise
*Assistant Examiner*—Shelly A. Chase
*Attorney, Agent, or Firm*—Robert E. Bushnell, Esq.

[57]  ABSTRACT

A magnetic disk drive apparatus adopting a PRML (Partial Response Maximum Likelihood) optimizes a Viterbi detector threshold value in order to optimize a read channel. The apparatus includes the steps of setting an average range of Viterbi detector threshold values for each head and storing the average range. The apparatus additionally includes the steps of writing and reading test data by using Viterbi detector threshold values within the average range of the Viterbi detector threshold values with respect to corresponding zones of the head, so as to evaluate minimum error rates for the respective zones of the head; setting the Viterbi detector threshold values corresponding to the minimum error rates for the respective zones of the head, as optimal Viterbi detector threshold values of the corresponding zones, and storing the optimal Viterbi detector threshold values into a storage; and storing the optimal Viterbi detector threshold values into a maintenance area of a disk.

20 Claims, 6 Drawing Sheets

METHOD FOR OPTIMIZING VITERBI DETECTOR THRESHOLD VALUES

CLAIM OF PRIORITY

This application makes reference to, incorporates the same herein, and claims all benefits accruing under 35 U.S.C. § 119 from an application for *METHOD FOR OPTIMIZING VITERBI DETECTOR THRESHOLD VALUE* earlier filed in the Korean Industrial Property Office on the 30$^{th}$ day of July 1996 and there duly assigned Ser. No. 1996-31523, a copy of which application is annexed hereto.

BACKGROUND OF THE INVENTION

FIELD OF THE INVENTION

The present invention relates generally to detection of data signals in a pulse communications system in which the data signals are received over a data degrading communications channel. In particular, the present invention has application to magnetic disk drive devices utilizing PRML (Partial Response Maximum Likelihood) detection. More particularly still, the present invention provides a method for optimizing threshold values used by a Viterbi detector incorporated in such disk drive device.

DESCRIPTION OF THE RELATED ART

Recently developed data storage devices, such as magnetic disk drive devices (i.e., hard disk drives), have increased storage capacity and increased data access speed. With these advantages, magnetic disk drive devices have become widely used as auxiliary memory devices for computer systems. More generally, developments in pulse communications related to these improvements in disk drive technology have recently provided increased speed and reliability in a wide range of pulse communications systems. The present invention will be described in detail in the context of magnetic disk drive devices, but persons skilled in the pulse communications arts will readily apprehend that this invention provides an improved method for data pulse detection in a wide variety of pulse communication contexts.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modern magnetic disk drive devices.

A read channel circuit in a generic read/write channel circuit of a magnetic disk drive device includes components for initial processing of the analog read signal generated by the read/write head of the device. This processing provides automatic gain control (AGC) amplification, filtering, and equalization, as well as analog-to-digital conversion. A recent innovation in such circuits has been the use of Viterbi detectors to detect data pulses in the digitized read signal. In this context, such a detector receives an equalized digital read signal and generates from it and encoded data signal, which is then decoded to produce the final read data signal.

The various components in such a read/write channel circuit introduce into the design and manufacturing process various parameters whose values affect the data storage density and the access speed of the device. Some of these parameters must be adjusted in the manufacturing process in order to optimize the characteristics of the read channel. The adjustable parameters are, for example, the data field cutoff frequency, the boost, the servo mode cutoff frequency, the write compensation, and the threshold value used by the Viterbi detector.

A set of values for these parameters that provides a minimum error rate for the device is determined for a given device design through experiments conducted upon a number of sample drives. The parameter values thus determined are uniformly applied to all devices of that design, regardless of the characteristics of the individual heads in the hard disk assembly or of the zones into which the disk is divided. If the actual parameter values for a given drive happen to match the average parameter values for the sampled drives, then the read channel performance will have been optimized. But if the characteristics of the drive components differ from the average characteristics for the sample drives, in accordance with variations in the characteristics of the individual head, disk, and head/disk interaction, then the performance of the read channel will be much lower than the anticipated average performance. Ultimately, a lower than optimal performance for the read channel will result in degraded performance for the disk drive device and a reduction in the device's life span.

The problem of data recovery from data signals received over pulse communication data channels and the use of adjustable detection threshold levels are well known in the literature. For example, U.S. Pat. No. 4,823,360, entitled *Binary Data Regenerator With Adaptive Threshold Level* and issued Apr. 18, 1989 to Tremblay et al., the disclosure of which is included herein by reference, shows a digital data recovery system that uses an adaptive threshold level to recover data with a minimum error rate. This system, however, does not recognize or take advantage of the special features of Viterbi detection methods in the context of pulse communication data channels.

Data signal detectors implementing maximum likelihood (ML) sequence estimation procedures of the Viterbi type are also well known in the signal processing literature. For example, U.S. Pat. No. 5,341,387, entitled *Viterbi Detector Having Adjustable Detection Thresholds For PRML Class IV Sampling Data Detection* and issued Aug. 23, 1994 to Nguyen, the disclosure of which is incorporated herein by reference, shows an improved Viterbi detector for use in high performance disk drives and having adjustable detection thresholds. The device of this reference allows the threshold levels of the Viterbi detector to be adjusted, within the context of the particular read/write channel circuit disclosed therein, to improve data channel performance. However, this system does not indicate how to adjust the threshold values for optimal performance of the disclosed data channel circuit. Neither does it raise the possibility of adjusting Viterbi threshold values for improved data channel performance in a more general circuit or for optimal performance in such a circuit.

U.S. Pat. No. 5,440,433, entitled *Circuit And Method For Adjusting A Data Detecting Level Of A Disk Driving Apparatus* and issued Aug. 8, 1995 to Yun, commonly assigned with the present application, discloses a system for adjusting a data detecting level in a pulse width modulation (PWM) read channel circuit. In this system, though, the detecting level is merely determined as the average of a maximum error-free detection level and a minimum error free detection level. That is, the disclosed method and circuit do not address optimization of data channel performance within a predetermined error rate limit.

U.S. Pat. No. 5,610,776, entitled *Method Of Optimizing Read Channel Of Disk Drive Recording Apparatus By Using*

*Error Rate* and issued Mar. 11, 1997 to Oh, also commonly assigned with the present application, does provide a method for selecting read channel parameters to optimize certain aspects of read channel performance in a disk drive device. However, the disclosed method only addresses adjustment of an equalizer boost level and a low pass filter bandwidth value to identify a boost level/bandwidth value pair that yields a measured error rate lower than a predetermined reference error rate. That is, this method achieves only partial optimization: it does not address the separate and more difficult problem of identifying value for a given parameter that will produce the lowest attainable error rate. Moreover, the reference method does not make systematic use of any optimization information that may be contained in the predetermined parameter values with which it starts.

I have therefore observed that a need exists for a method providing true optimization of adjustable parameter values in a high performance pulse communication data channels such as PRML data channels. In particular, a need exists for a method to select optimal threshold values for Viterbi-type detectors implemented in circuits that provide such data channels. Such a method should have particular application to the context of Viterbi detectors in read/write channel circuits of magnetic disk drive devices. Also, it should take advantage of known error rate data taken from measurements on sample circuits to identify threshold values for a Viterbi detector that will yield true minimum error rates.

SUMMARY OF THE INVENTION

It is therefore an object of the present invention to provide a method for optimizing a data degrading PRML data channel in a pulse data communications system.

It is another object of this invention to provide a method for optimizing such a data channel through selection of an optimal Viterbi detection threshold value.

It is further object of the present invention to provide a method for optimizing a read channel in a magnetic disk drive device utilizing PRML pulse detection.

It is still further object of the present invention to provide a method for true optimization of a Viterbi detector threshold value in such a device to achieve a minimum read channel error rate.

To achieve these and other objectives, a first aspect of the present invention provides a method for optimizing threshold values used in Viterbi detection of data pulses received from a data source over a data degrading PRML data channel. The method includes the step of selecting an average Viterbi detector threshold (VDT) range in which to test for an optimal VDT, with the average VDT range corresponding to the data degrading PRML data channel and including at least a first test VDT and a second test VDT. Further steps of the method include loading the first test VDT into a Viterbi detector associated with the data degrading PRML data channel, generating a first error rate signal representative of a first error rate corresponding to the first test VDT, loading the second test VDT into the Viterbi detector, and generating a second error rate signal representative of an error rate corresponding to the second test VDT. The method also includes the steps of comparing the first error rate signal to the second error rate signal, storing a value representative of the first error rate when the second error rate is not less than the first error rate, and storing a value representative of the second error rate when the second error rate is less than the first error rate.

In a second aspect, the present invention provides a method for optimizing a Viterbi detection threshold value for a magnetic disk drive device including at least one magnetic disk and at least one magnetic read/write head and utilizing PRML pulse detection. The method comprises the step of selecting an average VDT range corresponding to a magnetic read/write head included in the magnetic disk drive device, with the average VDT range including at least a first test VDT and a second test VDT. The method also includes the steps of loading the first VDT into a Viterbi detector associated with a read/write channel circuit included in the magnetic disk drive device, generating a first error rate signal representative of a first error rate corresponding to the first test VDT, loading said second test VDT into the Viterbi detector, and generating a second error rate signal representative of a second error rate corresponding to the second test VDT. The method further includes the step of selecting one of the first and second error rates as a minimum error rate and storing a value representative of the minimum error rate.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

Figure 3:
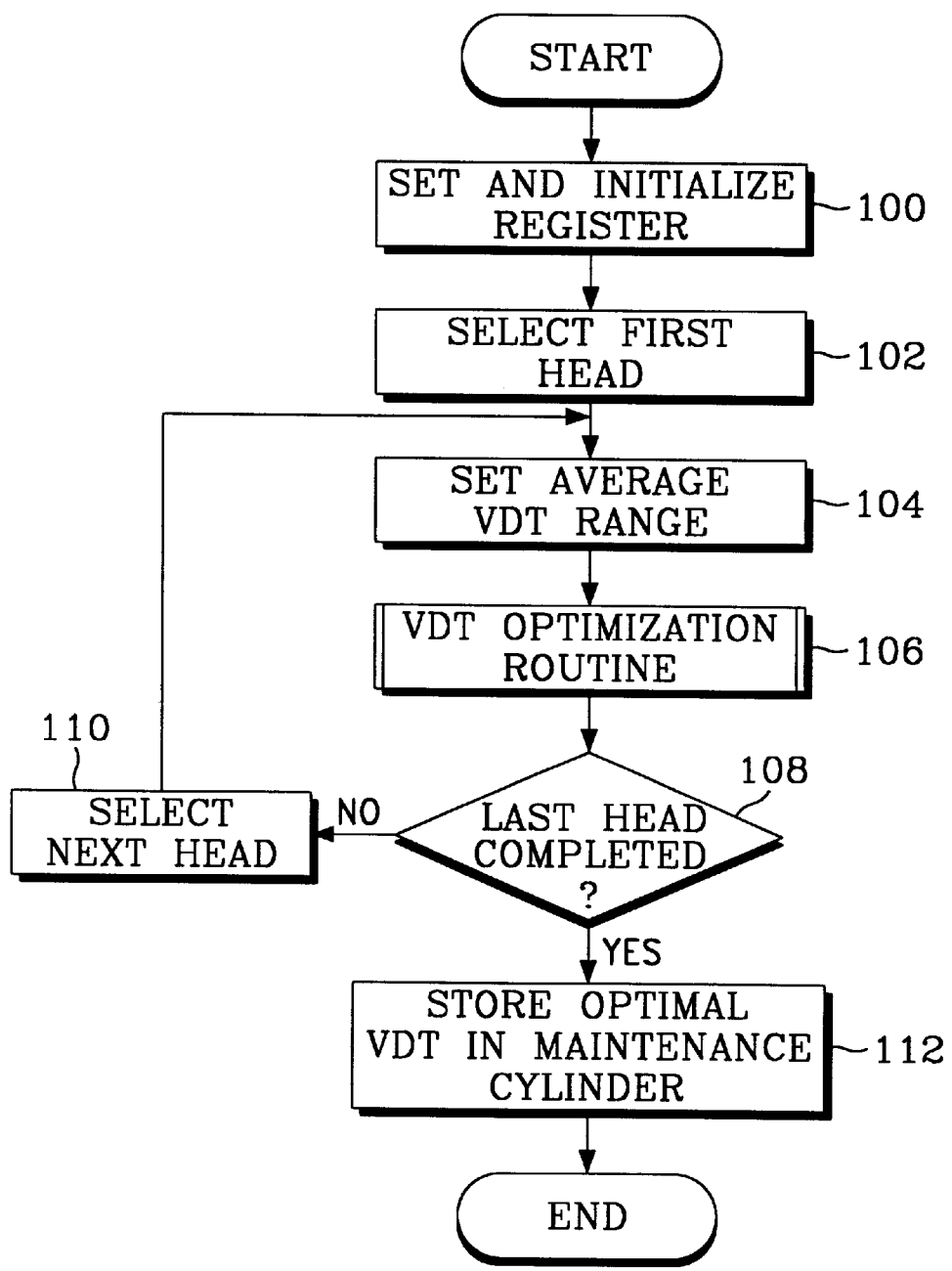
FIG. 3 is a flow chart depicting a method for optimizing Viterbi detector threshold values in accordance with one embodiment of the present invention.
Figure 4A:
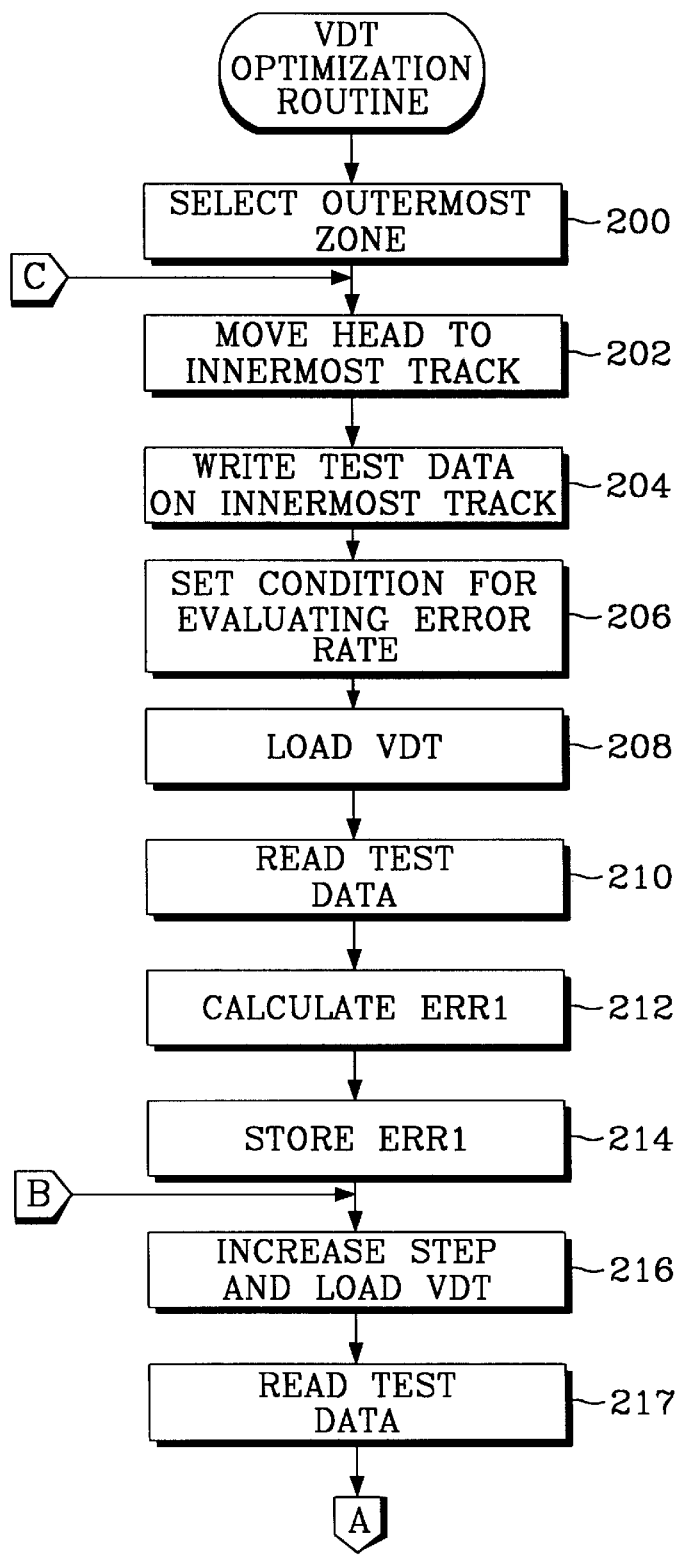
Figure 4B:
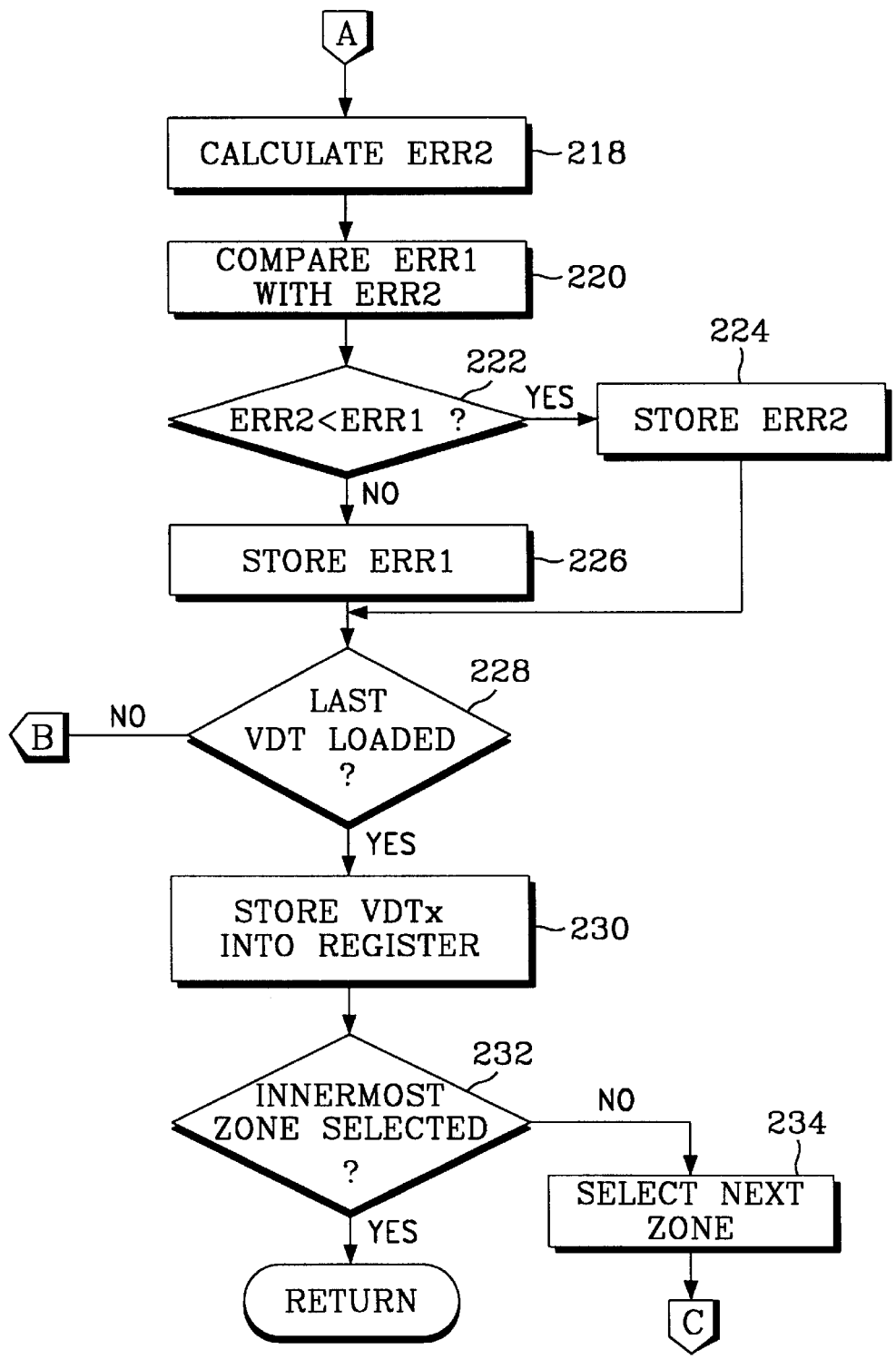
Figure 5:
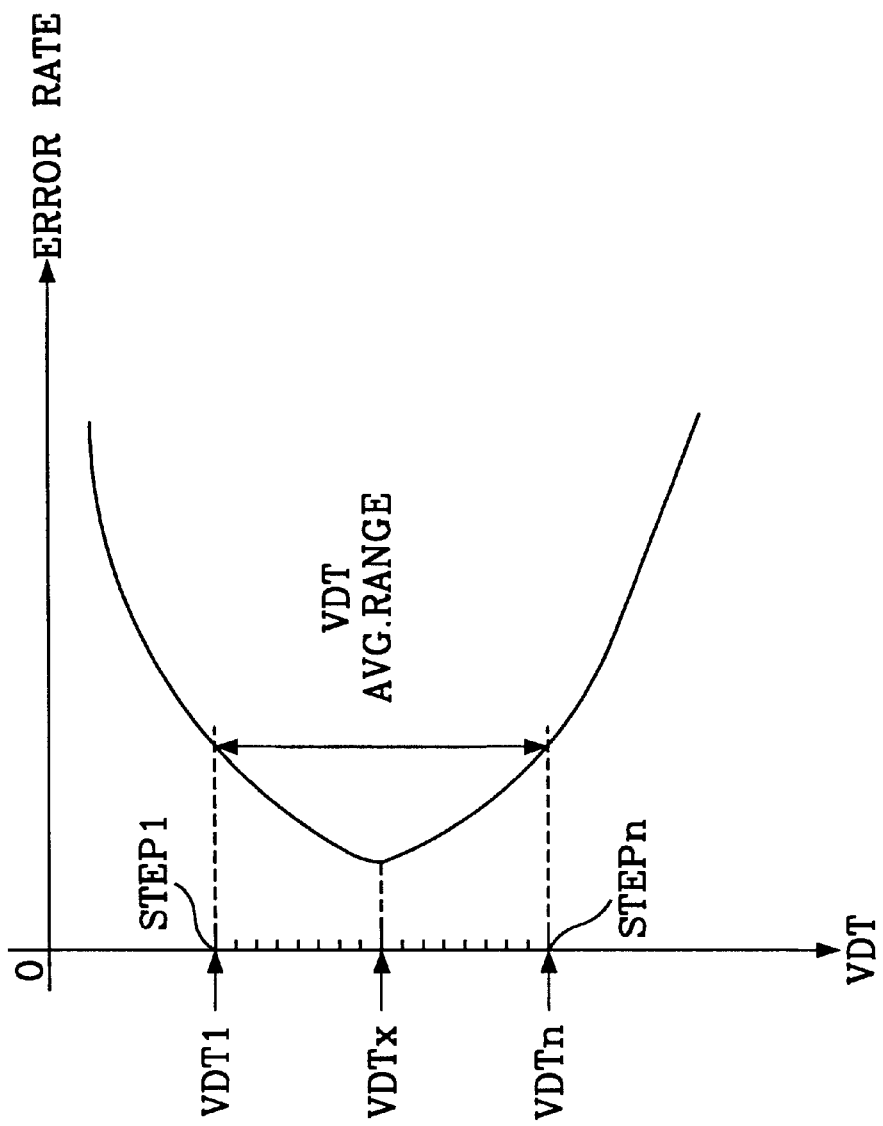

FIGS. 4A and 4B show a flow chart for an execution routine for Viterbi detector threshold value optimization carried out at a step 106 in the method of the flow chart shown in FIG. 3, in accordance with one embodiment of the present invention; and FIG. 5 is a characteristic curve for the Viterbi detector threshold values determined in accordance with the present invention, as a function of the error rate.

DETAILED DESCRIPTION OF THE PREFERRED EMBODIMENT

Figure 1:
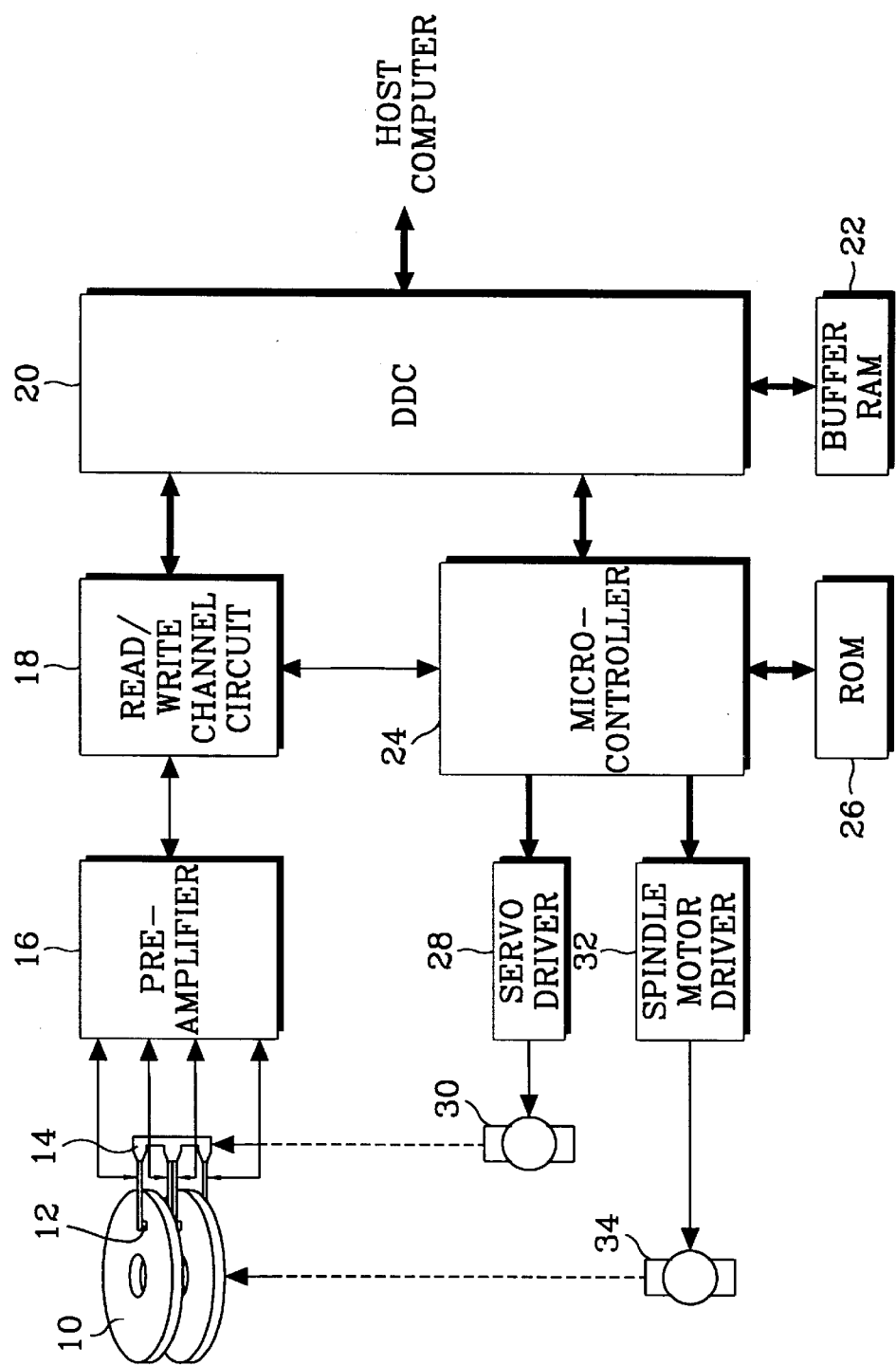
FIG. 1 is a block diagram of a generic magnetic disk drive device.
Figure 2:
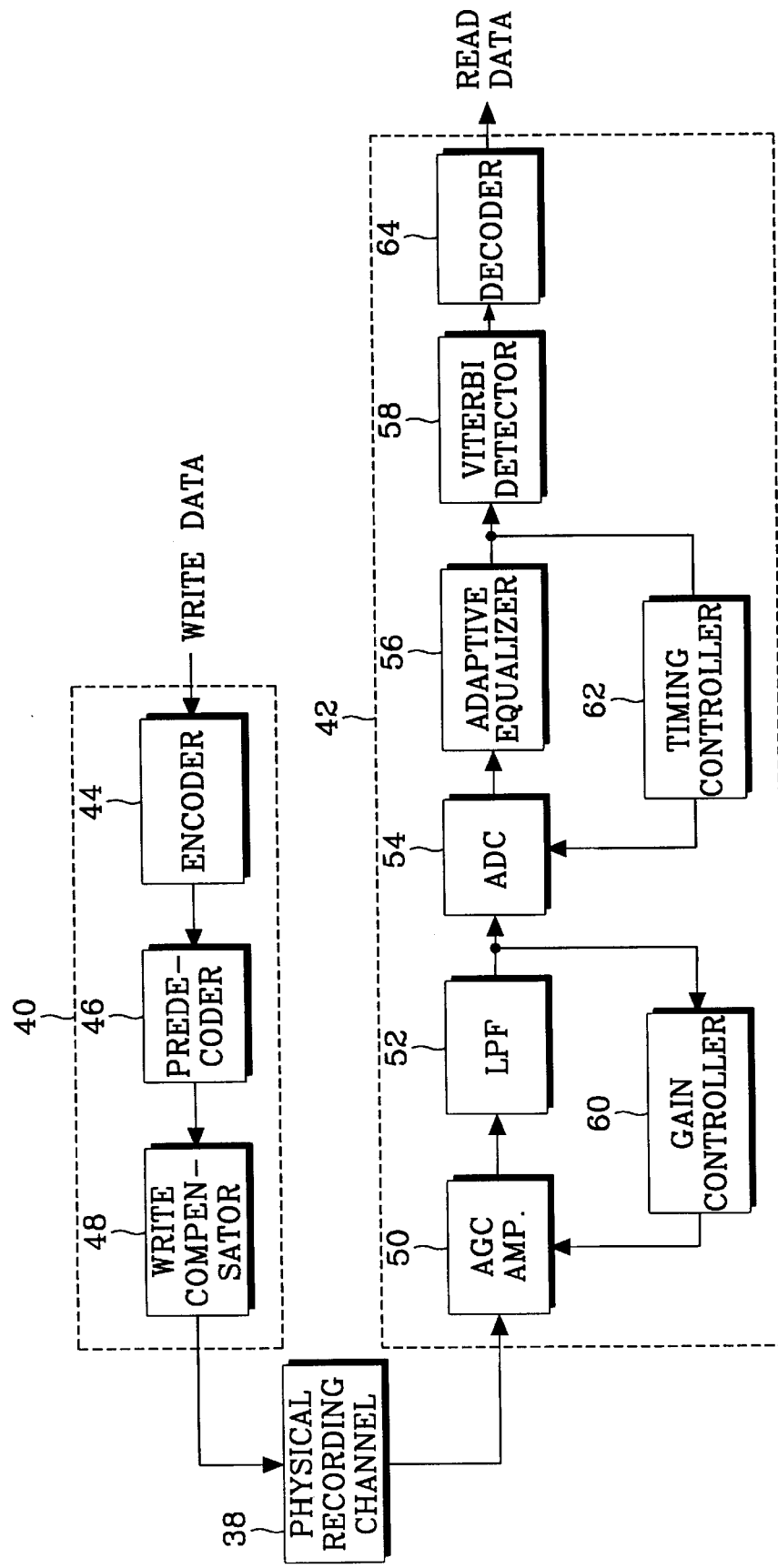
FIG. 2 is a block diagram of a read/write channel circuit such as might be used in the device of FIG. 1 and that employs PRML detection.

The device shown in FIGS. 1 and 2 will first be described to provide a better understanding of magnetic disk drive devices that employ PRML detection. FIG. 1 is a block diagram of a magnetic disk drive apparatus, and FIG. 2 is a block diagram of a read/write channel circuit 18 included in the device of FIG. 1, where a read channel circuit 42 of read/write channel circuit 18 employs PRML detection.

In FIG. 1, disks 10 are rotated by a spindle motor 34, and heads 12 are positioned at surfaces of corresponding ones of disks 10. Heads 12 are mounted on corresponding servo arms that extend from an E-shaped block assembly 14 to disks 10. Block assembly 14 has an associated rotary voice coil actuator 30 that moves block assembly 14 and thereby changes to positions of heads 12 for reading data from or writing data to a specified position on one or more of disks 10.

A pre-amplifier 16 pre-amplifies a signal picked up by heads 12 and thereby provides read/write channel circuit 18 with an amplified signal during a reading operation. During a write operation, pre-amplifier 16 transfers an encoded write data signal from the read/write channel circuit 18 to heads 12. In a read operation, read/write channel circuit 18 detects a data pulse from a read signal provided by pre-amplifier 16 and decodes the data pulse. Read/write channel circuit 18 transfers the decoded data pulse to a disk data controller (DDC) 20. Furthermore, read/write channel circuit 18 also decodes write data received from the DDC 20 and provides the decoded data to pre-amplifier 16.

DDC 20 both writes data received from a host computer (not shown) onto disks 10, through read/write channel circuit 18 and pre-amplifier 16, and transfers read data from disks 10 to the host computer. DDC 20 also interfaces between the host computer and a microcontroller 24. A buffer RAM (Random Access Memory) 22 temporarily stores data transferred between DDC 20 and the host computer, microcontroller 24, and read/write channel circuit 18. Microcontroller 24 controls track seeking and track following functions in response to read and write commands from the host computer.

A ROM (Read Only Memory) 26 stores a control program for microcontroller 24 as well as various setting values. A servo driver 28 generates a driving current for driving actuator 30 in response to a control signal, generated from microcontroller 24, that provides control of the position of heads 12. The driving current is applied to a voice coil of actuator 30. Actuator 30 positions heads 12 relative to disks 10 in accordance with the direction and amount of the driving current supplied from servo driver 28. A spindle motor driver 32 drives spindle motor 34, which rotates disks 10, in accordance with a control value generated from microcontroller 24 for controlling disks 10.

FIG. 2 provides a detailed diagram of an embodiment of read/write channel circuit 18 that employs PRML detection. Circuit 18 of FIG. 2 includes a physical recording channel 38 having a read/write means and a recording medium (i.e., heads 12 and disks 10), a write channel circuit 40 for writing data onto the recording medium, and a read channel circuit 42 for reading data from the recording medium. Write channel circuit 40 is composed of an encoder 44, a predecoder 46, and a write compensator 48. Read channel circuit 42 is composed of an automatic gain control (AGC) amplifier 50, a low pass filter (LPF) 52, an analog-to-digital converter (ADC) 54, an adaptive equalizer 56, a Viterbi detector 58, a gain controller 60, a timing controller 62, and a decoder 64.

In operation, encoder 44 encodes write data, input to be written onto the recording medium, into a predetermined code. An RLL (Run Length Limited) code, in which the number of adjacent zeros must remain between specified maximum and minimum values, is commonly used for this predetermined code. Recently a (0,4,4) GCR code, which is also a type of RLL code, has been used frequently for write data encoding. Predecoder 46 is included to prevent error propagation. Write compensator 48 reduces non-linear influences arising from the read/write head.

The transfer function for predecoder 46 is $$\frac{1}{1-D^2}$$

(where D is a delay operator $Z^{-1}$) in the case of a system using a class IV partial recognition (PR4) input/output relation. The physical recording channel 38, on the other hand, is represented by the transfer function $1-D^2$ in the case of PR4 detection. However, because the response of the actual recording channel does not exactly coincide with this transfer function, some subsequent equalization is always required.

Automatic gain control (AGC) amplifier 50 amplifies an analog signal read from the disk. Low pass filter 52 removes high frequency noise from and reshapes the signal output from AGC amplifier 50. The signal output from low pass filter 52 is converted into a discrete digital signal by analog-to-digital (A/D) converter 54. The resulting digital signal is then applied to adaptive equalizer 56 adaptively controls inter-symbol interference (ISI) to generate desired waveforms. Viterbi detector 58 receives the equalized signal output from adaptive equalizer 56 and from it generates encoded data. Decoder 64 decodes the encoded data output from Viterbi detector 58 to generate the final read data. At the same time, in order to correct the analog signal envelope and the digitization sample timing, gain controller 60 controls the gain of AGC amplifier 50 and timing controller 62 controls sample timing for A/D converter 54.

A preferred embodiment of the present invention will now be described with reference to FIGS. 1–3. The present invention is directed toward a method for optimizing a Viterbi detector threshold value from among read/write channel parameters in a read/write channel circuit using PRML detection. It should be noted that the present invention is applicable to a disk drive burn-in testing process included among the manufacturing processes carried out to manufacture such devices.

FIG. 3 illustrates an optimization procedure incorporating a Viterbi threshold level optimization method according to the principles of the present invention. At step 100, microcontroller 24 sets a number of data registers, in accordance with to the number of heads in physical recording channel 38 and the number of zones into which each one of disks 10 are divided, and initializes each of the registers. For example, if two disks 10 are used as shown in FIG. 1, the number of the heads will be 4. The number of the registers will thus depend upon the number of heads and zones prepared in the disk drive device. At step 102 microcontroller 24 selects a first head from among the several heads 12.

The method of the present invention advantageously utilizes error rates measured for sample devices to establish average threshold ranges in which a true optimum for Viterbi detector threshold values can be expected to occur. FIG. 5 provides an exemplary graph of a convex relation that can be expected to exist, in a specified range, between the Viterbi detection threshold value (VDT) and the error rate produced by that value. Such a relationship, determined in advance from measurements performed upon sample devices for the several heads in each device, provides average VDT ranges that are effective ranges for the average VDT for each head. In these average VDT ranges, the sampled devices exhibited relatively low error rates. By a low error rate it is meant that a ratio of data read errors to data write operations is relatively low. It has been found that optimal VDTs are associated with such average VDT ranges. Thus, by performing optimization within these average VDT ranges, the method of the present invention provides optimal VDTs that approximate VDTs corresponding to the lowest attainable error rates.

Microcontroller 24 reads, at a step 104, an average VDT range from an average VDT storage location corresponding to the selected head. The stored average VDT range is determined in advance in accordance with the characteristics of the selected first head. Microcontroller 24 then executes, at a step 106, a VDT optimization routine for each of the several zones into which disks 10 are divided. The VDT optimization routine of step 106 will be described in detail hereinbelow with reference to FIGS. 4a and 4b.

First, at a step 200, microcontroller 24 selects an outermost zone of the currently selected head (e.g., the first head, for the first cycle through steps 104–106). Then, at a step 202, microcontroller 24 moves the selected head to the innermost track of the selected zone (e.g., the outermost zone, for the first cycle through steps 202–230). At step 204 microcontroller 24 writes test data on the innermost track. Preferably, the test data is written only once. At step 206 microcontroller 24 sets various conditions for evaluating the error rate. These conditions may include, for example, the conditions that an off-track skew is set to 0%, an error is not corrected, and a retrial is not performed. The effect of setting the off-track skew to 0% is not to consider influences caused by internal or external disturbances.

At step 208, Viterbi detector 58 in the read/write channel circuit 18 loads an initial VDT from the average VDT storage, under the control of the microcontroller 24. The initial VDT corresponds to the value in FIG. 5 identified as VDT1. The method then entails a process of sequentially testing the error rates for a predetermined number of VDTs for the loaded average VDT range, through a sequence of test steps STEP1–STEPn. At step 210, for the current VDT STEP, microcontroller 24 repeatedly reads, a predetermined number of times, the test data written on the innermost track of the current zone. Microcontroller 24 then evaluates, at step 212, a first error rate ERR1. At step 214 the first error rate ERR1 is stored into an error rate storage.

At a step 216, microcontroller 24 increments to the next STEP (e.g., to STEP2 from STEP1) and loads into Viterbi detector 58 an average VDT for the new step (e.g., a VDT corresponding to STEP2) from the average VDT storage. Then, at step 217, microcontroller 24 again repeatedly reads, a predetermined number of times, the test data written on the innermost track of the current zone. At step 218 microcontroller 24 evaluates a second error rate ERR2 for the read test data. Step 220 provides a comparison of the previous error rate ERR1 with the current error rate ERR2.

At a step 222 it is determined whether the comparison of step 220 indicates that the current error rate ERR2 is less than the previous error rate ERR1. If so, then at step 224 the second error rate ERR2 is stored into the error rate storage. As the second error rate ERR2 is being stored, the first error rate ERR1 is deleted from the error rate storage. However, if the second error rate ERR2 is not less than the first error rate ERR1, then the first error rate ERR1 is stored again in the error rate storage. The above described steps 222 through 226 thus provide for selectively storing only the lower of the two error rates ERR1 and ERR2. A pointer, for example, is also saved to identify the VDT that generated the stored error rate.

Thereafter, at step 228, microcontroller 24 determines whether the VDT corresponding to the final step in the average VDT range, STEPn, has been loaded. As FIG. 5 indicates, VDTn represents the VDT corresponding to this last step STEPn. If the final VDT has not yet been loaded, microcontroller 24 returns to step 216 and repeats steps 216–228. In this manner, microcontroller 24 determines error rates for all the steps STEP1–STEPn within the average VDT range. After completion of this process for all of the steps STEP 1–STEPn, the error rate storage will have stored therein a minimum error rate from among the error rates for the VDTs tested in the average VDT range.

If it is determined at step 228 that the final VDT has been loaded, then at a step 230 microcontroller 24 stores into a register corresponding to the current head and the current zone of the disk (for example, the outermost zone and the first head) a VDT (indicated in FIG. 5 as VDTx) corresponding to the stored minimum error rate. For the illustrative case shown in FIG. 5, the VDT corresponding to the minimum error rate is VDTx, which at least closely approximates an optimal VDT for the current zone.

At a step 232 microcontroller 24 determines whether the innermost zone has been selected, i.e., whether steps 202–230 have been executed for the innermost zone. If not, then at step 234 microcontroller 24 selects the next inner zone and returns to step 202 to repeat steps 202–230. In this manner, it is possible to identify an optimal VDT for each of the several zones and for each of the heads. If it is determined at step 232 that the innermost zone has been selected, then microcontroller 24 returns to step 108 of the procedure illustrated in FIG. 3.

At step 108 FIG. 3, it is determined whether VDT optimization has been completed for all of the heads in the disk drive device. If not, then microcontroller 24 proceeds to step 110, where it selects the next head and returns to step 104 to repeat steps 104–108. If at step 108 it is determined that VDT optimization has been completed for all of the heads, then microcontroller 24 stores the optimal VDTs identified for the heads into a maintenance cylinder of the disk.

An optimization method for Viterbi detector threshold values has been described in detail here with particular application to optimizing the performance of a read/write channel circuit utilizing PRML detection. However, it should be clearly understood that the present invention also applies to optimizing other read/write channel parameters such as, for example, the data field cutoff frequency, the boost, the servo mode cutoff frequency, the write compensation, and so forth. Moreover, in addition to application within the context of magnetic disk drive devices, the present invention also has broad applicability to pulse communications systems generally wherein Viterbi PRML detection is used to detect data pulses received from a data source over a data degrading communication channel.

As the foregoing description indicates, a magnetic disk drive device employing PRML detection and implementing the present invention can perform true optimization of Viterbi detector threshold values from among the various read/write channel parameters. Moreover, although a preferred embodiment of the present invention has been described in detail here, it should be clearly understood that many variations and modifications of the present invention will be apparent to those skilled in the art and are considered as within the spirit and scope of the present invention as defined in the appended claims.

What is claimed is:

1. A method for optimizing threshold values used in Viterbi detection of data pulses received from a data source over a data degrading Partial Response Maximum Likelihood data channel, said method comprising the steps of:

reading an average Viterbi detection threshold range from a storing unit said average Viterbi detection threshold range being for testing an optimal Viterbi detection threshold, said average Viterbi detection threshold range corresponding to said data degrading Partial Response Maximum Likelihood data channel and including at least a first test Viterbi detection threshold and a second test Viterbi detection threshold;

loading said first test Viterbi detection threshold into a Viterbi detector associated with said data degrading Partial Response Maximum Likelihood data channel;

generating a first error rate signal representative of a first error rate corresponding to said first test Viterbi detection threshold;

loading said second test Viterbi detection threshold into said Viterbi detector;

generating a second error rate signal representative of a second error rate corresponding to said second test Viterbi detection threshold;

comparing said first error rate signal to said second error rate signal;

storing a value representative of said first error rate when said second error rate is not less than said first error rate; and storing a value representative of said second error rate when said second error rate is less than said first error rate.

2. The method of claim 1, further comprising the steps of:

receiving a first plurality of test data signals from said data source over said data degrading Partial Response Maximum Likelihood data channel using said Viterbi detector with said first test Viterbi detection threshold, with each one of said first plurality of test data signals representative of a predetermined test datum; and receiving a second plurality of test data signals from said data source over said data degrading Partial Response Maximum Likelihood data channel using said Viterbi detector with said second test Viterbi detection threshold, with each one of said second plurality of test data signals representative of a predetermined test datum.

3. The method of claim 2, wherein said first error rate signal is generated from said first plurality of test data signals and said second error rate signal is generated from said second plurality of test data signals.

4. The method of claim 3, wherein a first one of said first plurality of test data signals represents a first predetermined test datum not equal to a second predetermined test datum represented by a second one of said first plurality of test data signals.

5. The method of claim 3, wherein one of said first plurality of test data signals represents a first predetermined test datum not equal to a second predetermined test datum represented by one of said second plurality of test data signals.

6. The method of claim 1, further comprising the step of storing an indication of said first test Viterbi detection threshold when said value representative of said first error rate is stored and storing an indication of said second test Viterbi detection threshold when said value representative of said second error rate is stored.

7. The method of claim 3, wherein said step of generating said first error rate includes comparing each one of said first plurality of test data signals with a reliable data signal, with said reliable data signal reliably representative of said predetermined test datum represented by said one of said first plurality of test data signals.

8. The method of claim 1, wherein said data channel is a read channel provided by a read/write channel circuit in a magnetic disk drive device.

9. The method of claim 8, wherein said average Viterbi detection threshold range corresponds to a selected one of a plurality of magnetic read/write heads included in said device.

10. A method for optimizing a Viterbi detection threshold value for a magnetic disk drive device including at least one magnetic disk and at least one magnetic read/write head and utilizing Partial Response Maximum Likelihood pulse detection, said method comprising the steps of:

selecting an average Viterbi detection threshold range corresponding to a magnetic read/write head included in said magnetic disk drive device, with said average Viterbi detection threshold range including at least a first test Viterbi detection threshold and a second test Viterbi detection threshold;

loading said first Viterbi detection threshold into a Viterbi detector associated with a read/write channel circuit included in said magnetic disk drive device;

generating a first error rate signal representative of a first error rate corresponding to said first test Viterbi detection threshold;

loading said second test Viterbi detection threshold into said Viterbi detector;

generating a second error rate signal representative of a second error rate corresponding to said second test Viterbi detection threshold; and selecting one of said first and second error rates as a minimum error rate and storing a value representative of said minimum error rate.

11. The method of claim 10, further comprising the steps of:

generating each one of a first plurality of test data signals by reading a predetermined test datum from said magnetic disk through said magnetic read/write head and using said Viterbi detector with said first test Viterbi detection threshold to detect said test data signal; and generating each one of a second plurality of test data signals by reading a predetermined test datum from said magnetic disk through said magnetic read/write head and using said Viterbi detector with said second test Viterbi detection threshold to detect said test data signal.

12. The method of claim 11, wherein said first error rate signal is generated from said first plurality of test data signals and said second error rate signal is generated from said second plurality if test data signals.

13. The method of claim 10, wherein said step of selecting said one of said first and second error rates includes:

comparing said first error rate signal to said second error rate signal;

selecting said first error rate as said minimum error rate when said second error rate is not less than said first error rate; and selecting said second error rate as said minimum error rate when said second error rate is less than said first error rate.

14. The method of claim 11, wherein a first one of said first plurality of test data signals represents a first predetermined test datum not equal to a second predetermined test datum represented by a second one of said first plurality of test data signals.

15. The method of claim 11, wherein one of said first plurality of test data signals represents a first predetermined test datum not equal to a second predetermined test datum represented by one of said second plurality of test data signals.

16. The method of claim 11, wherein all of said first plurality of test data signals represent a single predetermined test datum.

17. The method of claim 16, wherein said single predetermined test datum is written to said disk once and read successively therefrom to generate each one of said first plurality of test data signals.

18. The method of claim 12, further comprising the step of adjusting one or more test conditions under which to generate said first and second pluralities of test data signals.

19. The method of claim 18, wherein said adjusted test conditions include off-track skew, error correction, and non-performance of retrial.

20. The method of claim 10, further comprising the step of storing an indication of said first test Viterbi detection threshold when said value representative of said first error rate is stored and storing an indication of said second test Viterbi detection threshold when said value representative of said second error rate is stored.

* * * * *